United States Patent
Mishra

(10) Patent No.: US 10,918,016 B2
(45) Date of Patent: Feb. 16, 2021

(54) SYSTEM AND METHOD FOR GRADING AGRICULTURAL COMMODITY

(71) Applicant: Intello Labs Private Limited, Haryana (IN)

(72) Inventor: Nishant Mishra, Rajasthan (IN)

(*) Notice: Subject to any disclaimer, the term of this patent is extended or adjusted under 35 U.S.C. 154(b) by 65 days.

(21) Appl. No.: 16/377,555

(22) Filed: Apr. 8, 2019

(65) Prior Publication Data

US 2019/0307069 A1 Oct. 10, 2019

(51) Int. Cl.
| | | |
|---|---|---|
| *G01N 21/85* | (2006.01) | |
| *B07C 5/342* | (2006.01) | |
| *A01D 41/127* | (2006.01) | |
| *B07B 13/065* | (2006.01) | |
| *G01N 21/84* | (2006.01) | |

(52) U.S. Cl.
CPC ........ *A01D 41/1277* (2013.01); *B07B 13/065* (2013.01); *G01N 21/85* (2013.01); *B07C 5/342* (2013.01); *G01N 2021/845* (2013.01); *G01N 2021/8592* (2013.01)

(58) Field of Classification Search
CPC ........ G06T 7/0002; G06T 2207/30128; G06K 2209/17; G06Q 50/02; G01N 2021/845; G01N 2021/8466; G01N 21/85; G01N 2021/8592; A01D 41/1277; B07B 13/065; B07B 15/00; B07C 5/342; B07C 5/3425
See application file for complete search history.

(56) References Cited

U.S. PATENT DOCUMENTS

| | | | |
|---|---|---|---|
| 2005/0027482 A1* | 2/2005 | Benaoudia et al. | G01N 21/3554 702/183 |
| 2012/0250025 A1* | 10/2012 | Moshe et al. | G01N 21/85 356/451 |
| 2014/0147015 A1* | 5/2014 | Bajema et al. | G06T 7/0004 382/110 |
| 2018/0047177 A1* | 2/2018 | Obropta et al. | G06T 7/0012 |

* cited by examiner

*Primary Examiner* — Andrew W Johns

(57) ABSTRACT

The present invention discloses a system and method for grading agricultural commodity comprising a moisture sensor, a grain apparatus, a conveyor belt driven by motor, a camera to take plurality of images of the agricultural commodity uniformly distributed on the conveyor belt, a communication device for transmitting information to a processor, which processes the image to ascertain the quality parameters of the agricultural commodity and compares with the standards used for grading, a user interface for displaying the information of grading and a printer to print the information of grading. Further, the moisture sensor provides the moisture reading of a sample of agricultural commodity put through the grain apparatus. Furthermore, the parameters are analyzed using image processing technique and compared with the Standard used for grading of the agricultural commodity to ascertain the grading. Additionally, the system can be integrated or several components at different places connected through network.

6 Claims, 3 Drawing Sheets

SYSTEM AND METHOD FOR GRADING AGRICULTURAL COMMODITY

BACKGROUND OF INVENTION

Technical Field

The present invention relates to assessment of quality of agricultural commodities. Particularly, the invention relates to a system for grading the agricultural commodities in accordance with grading Standards. More particularly, the invention relates to a system and method for automated grading of agricultural commodities including grains for better accuracy.

Description of the Related Art

The quality of agricultural commodities is of paramount importance in the Agricultural commerce. In the agricultural value chain, millions of transactions happen daily between two parties for different agricultural commodities like between farmer and mandi, or distributor and trader or supermarket to consumer to decide the price of commodity. The most important criteria to assess the price is the quality of agricultural commodity or the grading of agricultural commodity, which was done manually by looking at the grains. Further, with organization of the economic forces, and long distance trade being need of the hour, the quality of the agricultural commodities were formalized with uniform practice under different standards, like AGMARK, USDA's Grades and Standards. The problem with the manual grading is the human error and bias, which leads to corruption.

The present method of assessment of quality in the market includes manual grading of different agricultural commodities including grains. The problem with the manual grading solution is it is very subjective from person to person, which leads to an average accuracy level of around 60% for manual grading of the grains.

U.S. Pat. No. 5,135,114, discloses an apparatus for evaluating the grade of rice grains such as brown rice, white rice and unhulled rice grains, using brightness, amount of reflected light, to measure the wholeness of the rice grain. Further, U.S. Pat. No. 5,245,188 included reflected light measuring unit and the transmitted light measuring unit for evaluating the rice grains. The apparatus of U.S. Pat. No. 5,917,927 discloses inspection system for rice and other grains by a video camera system, and the data are processed to determined grain measurements, whether each grain is broken, and to obtain measures such as the percent broken by weight of a sample of rice, wherein the image data is processed to identify individual grains and then to perform measurements on them.

U.S. Pat. No. 9,607,368 provides for a grain appearance measuring apparatus includes imaging means for imaging a plurality of grains, analysis means for analyzing image information on the grains imaged by the imaging means in units of grains, processing means for processing the image information to form an aggregate image of the grains, and means for saving and/or displaying the aggregate image processed by the processing means. The disclosure relating to an apparatus in U.S. Patent Application 2004/014164 relates to a Computer imaging Systems are employed to image, analyze, classify and/or Sort Seeds and other agricultural items. The Systems may be local and/or remote, Serial and/or parallel processing, employing various classification Schemes including Fisher Linear Discriminant processing and various hardware including a color, digital Scanner.

The disclosure relating to an apparatus in U.S. Patent Application US 2014/0169629 is a system for determining the characteristics of a Volume of preferable small fungible products within an acceptable size range. The system may include a scale to determine a sample's weight, a camera to image the sample, an imaging table to permit viewing of the sample, a processor to determine the number of products in the sample, and a processor to deter mine the density of desired product. The system may also determine product count-per-weight, product Volume-per weight, and/or product Surface-area-per-weight. These determinations may be useful, including in determining product processing and packaging options. The disclosure relating to an apparatus in U. S. Patent Application US 2016/0078304 is a crop quality sensor, comprising an illumination source, an imaging device, and a processor executing application software. The illumination source is shone onto a crop sample, and an image is taken with the Imaging device of the illuminated crop sample. The software executing on the processor is used to analyze the image to identify the outlines of individual kernels and to identify which of those outlines contain a specular highlight, indicative that the kernel is whole and unbroken, while the absence of Such a specular highlight is indicative of a broken kernel.

Moreover, the manual interpretation and assessment of these qualities of the agricultural commodities, leads to very subjective assessment, which is at variance from one assessor to another. Generally, the sample size of grains of agricultural commodity for manual grading is 20-25 gms or few items for large agricultural commodity, which should be more to provide better assessment.

Additionally, the purpose of providing Standards for grading is defeated when the ultimate grading is not accurate and vary from one assessor to another. Whenever a system of standardization is made, sole purpose is to have correct assessment of the matter and to provide quality assurance. Further, the AGMARK standard and USDA's Grades and Standards of grading of agricultural commodities will have very low value, if accuracy of result is in question and the error may lead to wrong assessment. The Agriculture industry requires a better assessment system of grading of agricultural commodities, to have more reliability on the Standard of grading.

There is need for system and method to provide more accurate and uniform grading of agricultural commodities for better reliability on the grading Standards used.

OBJECTS OF INVENTION

An object of the present disclosure is to provide a system that enables grading of the agricultural commodity based on comparison of the properties of sample with grading standards of agricultural commodity to provide accurate grading.

Yet another object of the present disclosure is to provide a system that enables grading of agricultural commodity using state of art technology and to digitize the complete process of grading and removing the issue of subjectivity.

Still a further object of the present disclosure is to provide a system that enables a smartphone application to remotely control the system of grading and adapted to be used for many standards of grading for different variety of commodity based on grading standards used in a particular geography or for type of agricultural commodity.

Yet another object of the present disclosure is to make available a system that provides automated system for grading of agricultural commodity, using state of art technology and to digitize the complete process of grading and removing the issue of subjectivity

SUMMARY OF INVENTION

The present invention discloses a system and method for grading agricultural commodity comprising a moisture sensor, a grain apparatus, a conveyor belt driven by motor, a camera to take images of the agricultural commodity uniformly distributed on the conveyor belt, a communication device for transmitting information to a processor, a user interface for displaying the information and a printer to print the results. Further, the moisture sensor provides the moisture reading of a sample of agricultural commodity put through the grain apparatus. Wherein the sample is further put through the conveyor belt in uniform manner, such that no two grain/piece of the agricultural commodity overlap over each other, which is driven by the motor. Furthermore, the camera takes a plurality of images of the agricultural commodity moving through the conveyor belt.

The present invention further discloses the communication device, which send moisture reading and images of the grains to the processor, wherein the processor process the information received and ascertain the count of normal, weevilled, shriveled, broken, partially broken, discolored grains, presence of other varieties of same grains, foreign materials, husks, being whole, firm, intact, fresh in appearance (shining skin), well trimmed, clean, free of any visible foreign matter etc. Further, the data is normalized over the sample size for ascertaining the percentage of purity and quality of the agricultural commodity. Furthermore, the data is analyzed and compared with the Standard used for grading of the agricultural commodity in that particular market. Moreover, the grading data is displayed through the user interface.

In general, in one aspect of the invention, the user has option to put sample of agricultural commodity into the grain apparatus, where the moisture reading is taken by the moisture reader, which further communicate the moisture reading to the processor using the communication device.

In another aspect of the present invention, the grain apparatus puts the agricultural commodity on the conveyor belt uniformly, such that no two grain or article of agricultural commodity are overlapping, wherein the conveyor belt move the grains and the Camera takes visual images of the grains of agricultural commodity. Further, there are multiple visual image of the agricultural commodity, to ascertain the physical characteristic of each grain or piece or article, by the Processor. The visual images are communicated through a communication device, which uses state of art technology, like Bluetooth, wi-fi or NFC, for transmitting data from the moisture sensor and the Camera to the Processor.

In still another aspect of the present invention, the Processor analyze each and every image to ascertain the count of normal, weevilled, shriveled, broken, partially broken, discolored grains, presence of other varieties of same agricultural commodity, foreign materials, husks and other physical properties.

In still another aspect of the present invention, the Processor comprises of a communication module to receive and transmit data and an analysis module to analyze the data received from camera and moisture sensor to get the physical properties of the agricultural commodity. The Processor further comprises of a comparison module, to provide grading of the agricultural commodity, based on comparison of the analyzed data and set parameter of the Standards, like AGMARK standard and USDA's Grades and Standards, stored in a Database. Further, the comparison module is customizable for comparing the analyzed data with Standards of grading stored in the database, used in a particular geography or types of agricultural commodity or selected by the user. Moreover, after comparison of data, the grading of agricultural commodity based on the Standard selected by the user, is being displayed on the user interface.

In still another aspect of the invention, the system further comprises a Printer for printing the report of result of assessment of grading.

In still another aspect of the invention, the present disclosure envisages a computer implemented system and method for grading agricultural commodity. The system envisaged by the present disclosure analyze the grains or articles of the agricultural commodity and compares the properties with grading standards of agricultural commodity to provide accurate grading. The system envisaged by the present disclosure. The system comprises of a moisture sensor, a grain apparatus, a conveyor belt driven by motor, a camera to take images of the agricultural commodity uniformly distributed on the conveyor belt, a communication device for transmitting information to a processor, a user interface for displaying the information and a printer to print the results.

In still another aspect of the invention, the Computer implemented system envisaged by the present disclosure, comprises of a communication module to receive and transmit data, an analysis module to analyze the data received from camera and moisture sensor to get the physical properties of the agricultural commodity using deep learning algorithm. The system further comprises of a comparison module, to provide grading of the agricultural commodity, based on comparison of the analyzed data and set parameter of the Standards, stored in a Database. Further, the comparison module is customizable for comparing the analyzed data with other Standards of grading stored in the database, used in a particular geography or types of agricultural commodity or selected by the user. Moreover, after comparison of data, the grading of agricultural commodity based on the Standard selected by the user, is being displayed on the user interface.

In yet another aspect of the present invention, the system is integrated or has several components at different places, and the processor may process the information on a computing device, including smartphone, computer or specific device used of only grading, and displays the grading information on user interface of such device.

BRIEF DESCRIPTION OF THE ACCOMPANYING DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF INVENTION

Figure 1:
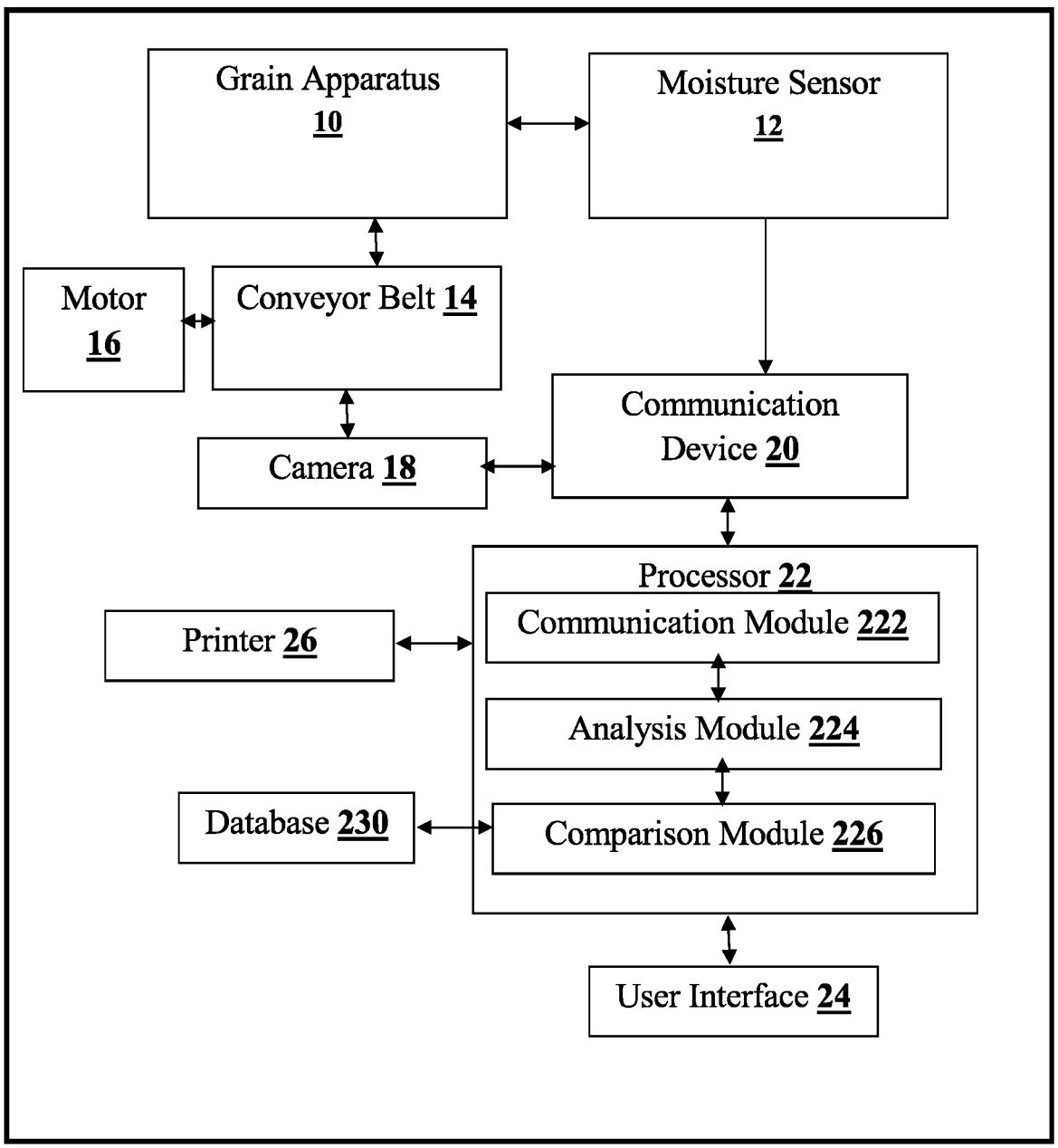
FIG. 1 is a block diagram of the system for grading agricultural commodity, in accordance with an aspect of the present technique.

The following description is full and informative description of the best method presently contemplated for carrying out the present invention which is known to the inventors at the time of filing the patent application. Of course, many modifications and adaptations will be apparent to those skilled in the relevant arts in view of the following description in view of the accompanying drawings and the appended claims.

The present invention relates to assessment of quality of agricultural commodities. Particularly, the invention relates to a system for grading the agricultural commodities in accordance with grading Standards. More particularly, the invention relates to a system and method for automated grading of agricultural commodities for better accuracy.

The present invention discloses a system and method for grading of agricultural commodity comprising a grain apparatus (10), a moisture sensor (12), a conveyor belt (14) driven by a motor (16), a camera (18) to take images of the agricultural commodity uniformly distributed on the conveyor belt (14), a communication device (20) for transmitting information to a processor (22), a user interface (24) for displaying the information, and a printer (26) for printing the assessment results. Further, the sample of grain is being kept in the grain apparatus (10), wherein the moisture sensor (12) assess the moisture reading, which in turn sent to the processor (22) by the communication device (20). Furthermore, the grain apparatus (10) releases the agricultural commodity on the conveyor belt (14) in uniform manner, such that no two grains or pieces or articles overlap each other, wherein the conveyor belt (14) is driven by the motor (16). The Camera (18) takes the visual images of agricultural commodity on the moving conveyor belt, which in turn send to the processor (22) using the communication device (20).

In one embodiment of the present invention, the communication device (20) transmit the moisture reading and the visual images of the agricultural commodity to the processor (22) through Bluetooth technology, wherein the processor process the information received and ascertain the count of normal, Weeviled, shriveled, broken, partially broken, discolored grains, presence of other varieties of same grains, foreign materials, husks, being whole, firm, intact, fresh in appearance (shining skin), well trimmed, clean, free of any visible foreign matter, free from bruising or extensive healed overcuts, free from damage caused by pest or diseases, free from abnormal external moisture, excluding condensation following removal from cold storage, free from foreign smell or taste, free from signs of internal shriveling or dehydration or water-soaking, free from damage caused by low temperature or high temperature or frost, free from chemical traces, artificial color, free from grittiness of skin, free from fissures or cavities on the surface, free from internal blackening or color of flesh or seeds, etc. Further, the data is normalized over the sample size for ascertaining the percentage of purity and quality of the agricultural commodity. Furthermore, the data is analyzed and compared with the Standard used for grading of the agricultural commodity. Moreover, the grading data is displayed through the user interface (24).

For sake of brevity, the term grains is used for sample of agricultural commodity to be graded, and each grain means each article or item of the agricultural commodity, wherein the agricultural commodity includes but not limited to agricultural commodities namely, Mango, Apple, Banana, Citrus, Guava, Grapes, Litchi, Papaya, Pineapple, Pomergranate, Onion, Cauliflower, Potato, Tomato, Brinjal, Ladies Finger, Peas, Cauliflower, Carrot, Chilli, Cashew, Dry Chillies, Garlic, Ginger, Turmeric, Wheat, Rice, Corn, Soybean, Sugar, Mustard, Jowar (Sorghum/new quinoa), Cardamom, Urad (Black Gram), Moong (Green Gram), Bajra (Pearl millet), Mustard, Coriander.

In another embodiment of the invention, the user has option to put sample of agricultural commodity, up to 100 gms, into the grain apparatus (10), which provides better assessment of the overall quality of the agricultural commodity. Traditionally, the sample taken for grading is around 20-25 gms, which may not be sufficient sample size for assessment, and in case the amount of sample size is increased the final assessment is more reliable.

In another embodiment of the present invention, the communication device may spread over the grain apparatus and the user device. Further, the user device may be integrated over the apparatus or is a separate device like computer or mobile device for communicating the data to the Processor (22). The Processor may be integrated with overall system or is part of the user device, as explained above.

In one embodiment of the invention, the Camera (18) is integrated on the system or is a separate camera device used for taking picture, including camera of a smartphone, which may use communication system of such device to transmit the visual images to the Processor (22). Further, the grain apparatus (10) put the agricultural commodity on the conveyor belt uniformly, such that no two grains or pieces or article are overlapping, wherein the conveyor belt move the agricultural commodity and the Camera (18) takes visual images of the agricultural commodity, which may be taken by the user separately, and send to the Processor (22), using inbuilt communication feature with the camera, one such example is smartphone, where camera is used for taking the visual images and other features of the smartphone may be used for transmitting the visual images to the processor (22). Furthermore, multiple visual images of the agricultural commodity are taken, to ascertain the physical characteristic of each grain or article, by the Processor (22). Moreover, the visual images are communicated through the communication device, which uses state of art technology, like Bluetooth, wi-fi or NFC, for transmitting data from the moisture sensor (12) and/or the Camera (18) to the Processor (22).

In one embodiment of the present invention, the processor (22) comprises of a communication module (222) to receive and transmit data and an analysis module (224) to analyze the data received from camera and moisture sensor to get the physical properties of the agricultural commodity. The Processor further comprises of a comparison module (226), to provide grading of the agricultural commodity, based on comparison of the analyzed data and set parameter of the Standards, like AGMARK standard and USDA's Grades and Standards, stored in a database (230). Further, the comparison module (226) is customizable for comparing the analyzed data with Standards of grading stored in the database (230), used in a particular geography or types of agricultural commodity or selected by the user. Moreover, after comparison of data, the grading of agricultural commodity based on the Standard selected by the user, is being displayed on the user interface. Further the analysis module (224) analyzes the visual image data of the agricultural commodity, received through the communication module (222) from the Camera (18) to ascertain various parameters including physical characteristic of the agricultural commodity and the existence of foreign material in the sample. Further, the analysis module (224) analyzes each and every image to ascertain the count of normal, weeviled, shriveled, broken, partially broken, discolored grains and presence of other varieties of same agricultural commodity, foreign materials, husks and other physical properties like mature but not overripe, clean, fairly well formed, free from decay, internal browning, internal breakdown, soft scald, scab, freezing injury, visible water core, and broken skins, injury caused by bruises, brown surface discoloration, smooth net-like russeting, sunburn or sprayburn, limb rubs, hail, drought spots, scars, disease, insects, or other means, damage caused by bitter pit or Jonathan spot and by smooth solid, slightly rough or rough russeting, or stem or calyx cracks, etc. using the visual image point data of agricultural commodity, using image processing. Moreover, the presence of other varieties of same agricultural commodity, foreign materials and husks are also analyzed from the visual image data.

In one embodiment of the present invention, the analysis module (224) uses deep learning algorithms to analyze the data received for better assessment of physical characteristic of the agricultural commodity, which is continuously improving the assessment methodology. Further, the analysis module (224) analyzes each and every image to ascertain the physical characteristic, and compares to the earlier data to have more data point to ascertain the quality in better manner. The analysis module uses an identification algorithm consists of 3 different type of algorithms depending on the size and shape of the commodities, which uses innovative noise reduction/cancellation, selective curve fitting algorithms using convex point detections and optimal tangent algorithms to reach an identification accuracy (~9%) of objects. The analysis module further uses a classification algorithms consists of multi-layers approach for size, shape, edge, defect, sister defect layers to accurately classify each and every object to its proper subcategory. The proprietary algorithms of identification and classification are complex and support for smallest of grains (wheat) to midsize commodities (strawberries) to big size commodities like (cauliflower), the defects are even smaller than the commodity adds complexity in the classification further.

In one embodiment of the present invention, the comparison module (226), compares the analyzed data and set parameter of the Standard stored in the database (230). The comparison module contains the standard data point for each types and variety of agricultural commodity according to the Standards selected by the user or applied in the geographical location, one of such Standard is AGMARK standard for grading the agricultural commodity in India. Further, the comparison module (226) is customizable for comparing the analyzed data with different Standards of grading, used in a particular geography or used for types of agricultural commodity. Moreover, after comparison of data, the grading of agricultural commodity based on the Standard used, is sent via the communication module (220) to the user interface (24) for display.

In one embodiment of the present invention, the user interface may be integrated on the overall system, or may be of user device including smartphones, which is capable of displaying such data. The grading data of the agricultural commodity may be transmitted by the Processor (22) to other computing devices by the communication module (226).

In one embodiment of the present invention, the printer (26) may be integrated on the overall system, for printing the assessment result by the processor. Further, the overall system can work without any kind of network, as all components are connected through hardware.

In one embodiment of the present invention, the system is integrated or has several components at different places, and the processor may process the information on a computing device, including smartphone or specific device used only for grading, and displays the grading information on user interface of such device. Further, wherein the Processor (22) is on the smartphone or computer along with a software application configurable by the user, to control the overall system remotely via mobile device or a computer through communication device.

In an exemplary embodiment, FIG. 1 is a block diagram of the System for grading of agricultural commodity, illustrating various components of the system having a grain apparatus (10), a moisture sensor (12), a conveyor belt (14) driven by a motor (16), a camera (18) to take images of the agricultural commodity uniformly distributed on the conveyor belt (14), a communication device (20) for transmitting information to a processor (22) comprises of a communication module (222) to receive and transmit data, an analysis module (224) to analyze the data received, a comparison module (226), to provide grading of the agricultural commodity, based on comparison of the analyzed data and set parameter of the Standards, stored in a Database (230), a user interface (24) for displaying the information; and a printer (26) to print the results.

Figure 2:
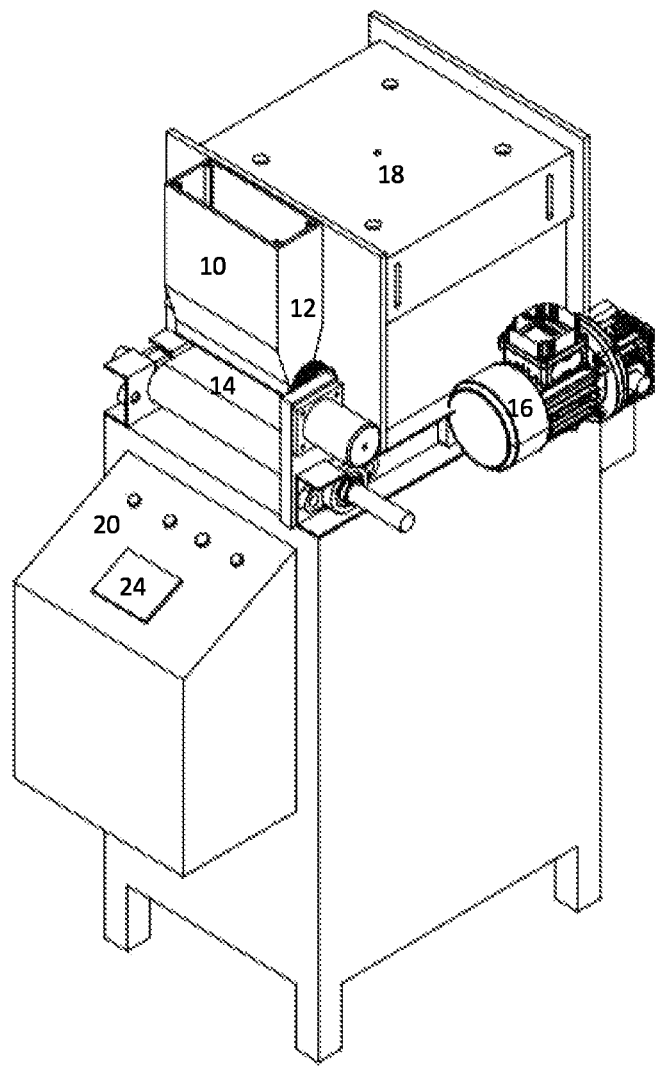
FIG. 2 is a top view of the system for grading agricultural commodity, in accordance with an aspect of the present technique.

In another exemplary embodiment, FIG. 2 is a top view of the system for grading of agricultural commodity, illustrating various components of the system having a grain apparatus (10), a moisture sensor (12), a conveyor belt (14) driven by a motor (16), a camera (18), which is mounted inside to take images of the agricultural commodity uniformly distributed on the conveyor belt (14), a communication device (20) and a user interface (24). Further, the communication device (20) comprises of switch to control the machine and means to control the system using any external device through software application.

Figure 3:
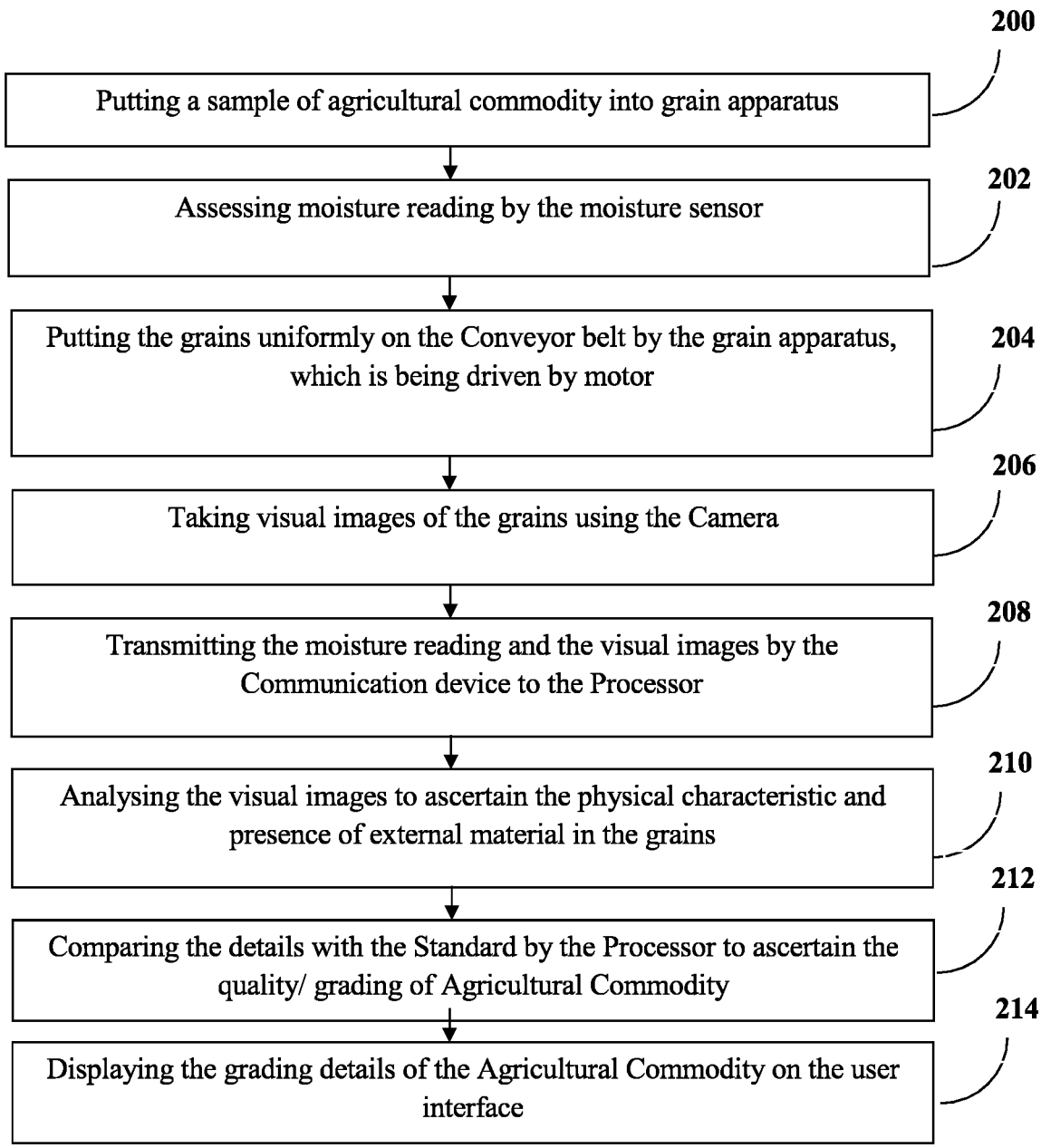
FIG. 3 is a flowchart illustrating the method for grading agricultural commodity, in accordance with an aspect of the present technique.

In another exemplary embodiment, FIG. 3 is a flow-chart of the method for grading the agricultural commodity, illustrating the process involved in grading the agricultural commodity from a sample chosen by the user, wherein the process comprises steps of: Putting a sample of agricultural commodity into grain apparatus by the user (200); Assessing moisture reading by the moisture sensor (202) Putting the agricultural commodity uniformly on the Conveyor belt by the grain apparatus, which is being driven by the motor (204); Taking a plurality of visual images of the agricultural commodity using the Camera (206); Transmitting the moisture reading and the visual images by the Communication device to the Processor (208); Analysing the visual images to ascertain the physical characteristic and presence of other material in the agricultural commodity (210); Comparing the details with the Standard by the Processor to ascertain the quality/grading of agricultural commodity (212); Displaying the grading details of the agricultural commodity on the user interface (214).

The advantages of the embodiment provided herein comprises to provide automated system for grading of agricultural commodity, using state of art technology and to digitize the complete process of grading and removing the issue of subjectivity, which results in around 94% accuracy, while manual grading process result in average accuracy of around 60%. Further advantages are sample size used may be more for reliable result, the system can be controlled remotely through a Smartphone application and improves itself using deep learning techniques for better result. Also, the system can be used for many Standards of grading and for many types and variety of grains.

In still another embodiment of the invention, the present disclosure envisages a computer implemented system and method for grading agricultural commodity. The system and method envisaged by the present disclosure analyze the grains or articles of the agricultural commodity and compares the properties with grading standards of agricultural commodity to provide accurate grading. The system and method envisaged by the present disclosure. The system comprises of a moisture sensor (12), a grain apparatus (10), a conveyor belt (14) driven by a motor (16), a camera (18) to take images of the agricultural commodity uniformly distributed on the conveyor belt, a communication device (20) for transmitting information to a processor (22) and a user interface (24) for displaying the information. The system further comprises of a printer to print the results.

In yet another embodiment of the present disclosure, a computer implemented method for grading agricultural commodity based on standards of grading is disclosed. The computer implemented method comprising of the following steps: putting a sample of agricultural commodity into grain apparatus; assessing moisture reading by the moisture sensor putting the agricultural commodity uniformly on the Conveyor belt by the grain apparatus, which is being driven by motor; capturing a plurality of visual images of the agricultural commodity moving through conveyor belt using the Camera; transmitting the moisture reading and the plurality of the visual images by a communication device to a Processor, which receives the data using a communication module, and process the data comprising following steps; analyzing the plurality of visual images and moisture reading to ascertain the physical property data and presence of other material in the sample of agricultural commodity by an analysis module; and comparing the analyzed data provided by the analysis module with the Standard stored in a database by a comparison module to ascertain the quality/grading of agricultural commodity; and displaying the grading data by a user interface received from a communication module of the processor.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Accordingly, the foregoing description of the present invention should be considered as merely illustrative of the principles of the present invention and not in limitation thereof.

I claim:

1. A system for grading an agricultural commodity based on standards of grading, the system comprising:
    a grain apparatus for receiving a sample of the agricultural commodity;
    a moisture sensor for capturing a moisture reading of the sample of agricultural commodity;
    a conveyor belt driven by a motor, wherein the conveyor belt receives the sample from the grain apparatus in a uniform manner such that no two articles of the agricultural commodity overlap each other;
    a camera adapted to take a plurality of images of the agricultural commodity moving through the conveyor belt;
    a communication device adapted for transmitting the moisture reading received from the moisture sensor and the plurality of images captured by the camera to a processor adapted to process the data received, wherein the processor comprises:
        a communication module adapted to receive and transmit data to other devices;
        an analysis module adapted to analyze the moisture reading received from the communication module and the plurality of images received from the camera, to obtain physical property data and ascertain a presence of other material in the sample of the agricultural commodity; and
        a comparison module, to compare the physical property data received from the analysis module with standards and provide grading data of the agricultural commodity to be displayed on a user interface;
    wherein said system is configured as an integrated system or has several components at different places, and said processor is further integrated with a software application on a computing device, including a smartphone or computer.

2. The system as claimed in claim 1, wherein the standards are preselected by the user or auto selected based on a particular geography or types of the agricultural commodity.

3. The system as claimed in claim 1, wherein said system further comprises a printer for printing grading reports.

4. A method for grading an agricultural commodity based on standards of grading, the method comprising of the following steps:
    putting a sample of the agricultural commodity into a grain apparatus;
    assessing moisture reading by a moisture sensor;
    putting the agricultural commodity uniformly on a conveyor belt via the grain apparatus, which is being driven by a motor;
    capturing a plurality of visual images of the agricultural commodity moving through a conveyor belt using a camera;
    transmitting the moisture reading and the plurality of the visual images by a communication device to a processor, which receives the data using a communication module, and process the data by:
        analyzing the plurality of visual images and moisture reading to ascertain the physical property data and presence of other material in the sample of the agricultural commodity by an analysis module; and
        comparing the analyzed data provided by the analysis module with standards by a comparison module to ascertain the quality or grading of the agricultural commodity;
    displaying the grading data by a user interface received from a communication module of the processor;
    wherein the method is performed at one location in offline mode or at several places with several components at different places, wherein the processor is integrated with a software application on a computing device, including a smartphone or computer.

5. The method as claimed in claim 4, wherein the standards are preselected by the user or auto selected based on a particular geography or types of the agricultural commodity, and the method further includes the step of recognizing at least a swipe left gesture and a swipe right gesture performed by the user, on the user interface.

6. A computer implemented method for grading an agricultural commodity based on standards of grading, the computer implemented method comprising of the following steps:
- putting a sample of the agricultural commodity into a grain apparatus;
- assessing moisture reading by a moisture sensor;
- putting the agricultural commodity uniformly on a conveyor belt via the grain apparatus, which is being driven by a motor;
- capturing a plurality of visual images of the agricultural commodity moving through the conveyor belt using a camera;
- transmitting the moisture reading and the plurality of the visual images by a communication device to a processor, which receives the data using a communication module, and process the data by:
  - analyzing the plurality of visual images and moisture reading to ascertain the physical property data and presence of other material in the sample of the agricultural commodity by an analysis module; and
  - comparing the analyzed data provided by the analysis module with the standards stored in a database by via a comparison module to ascertain the quality or grading of the agricultural commodity; and
- displaying the grading data received from the communication module on a user interface;
- wherein the standards are preselected by the user or auto elected based on a particular geography or types of the agricultural commodity, the data being processed with an additional step of recognizing at least a swipe left gesture and a swipe right gesture performed by the user via the user interface;
- wherein the method is performed at one location in offline mode or at several places with several components at different places, wherein the processor is integrated with a software application on a computing device, including a smartphone or computer.

* * * * *